United States Patent
Boggs

(10) Patent No.: US 9,665,431 B2
(45) Date of Patent: May 30, 2017

(54) INTERRUPTED WRITE PROTECTION WITH GENERIC STORAGE

(71) Applicant: TERADATA US, INC., Dayton, OH (US)

(72) Inventor: Gary Lee Boggs, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 130 days.

(21) Appl. No.: 14/570,280

(22) Filed: Dec. 15, 2014

(65) Prior Publication Data

US 2015/0186205 A1 Jul. 2, 2015

Related U.S. Application Data

(60) Provisional application No. 61/922,544, filed on Dec. 31, 2013.

(51) Int. Cl.
  *G06F 11/00* (2006.01)
  *G06F 11/14* (2006.01)
  *G06F 13/24* (2006.01)
  *G06F 11/07* (2006.01)

(52) U.S. Cl.
  CPC ........ *G06F 11/141* (2013.01); *G06F 11/0727* (2013.01); *G06F 11/1402* (2013.01); *G06F 13/24* (2013.01); *G06F 2201/80* (2013.01)

(58) Field of Classification Search
  CPC .............. G06F 11/141; G06F 11/0709; G06F 11/0727; G06F 11/1004; G06F 11/1402; G06F 11/1438; G06F 13/24; G06F 2201/80
  USPC ........................ 714/16, 6.1, 6.2, 42, 47.1, 54
  See application file for complete search history.

(56) References Cited

U.S. PATENT DOCUMENTS

| | | | | |
|---|---|---|---|---|
| 5,889,933 A | * | 3/1999 | Smith | G06F 1/30 714/20 |
| 7,546,482 B2 | * | 6/2009 | Blumenau | G06F 11/1435 710/15 |
| 2002/0007469 A1 | * | 1/2002 | Taketa | G06F 11/1076 714/5.11 |
| 2007/0033157 A1 | * | 2/2007 | Gray | G06F 17/30371 |

\* cited by examiner

*Primary Examiner* — Joseph D Manoskey
(74) *Attorney, Agent, or Firm* — James Stover

(57) ABSTRACT

A system and method providing interrupted write protection to a stand-alone commodity storage array utilized within a database system. The method identifies writes of data from the database system to the storage array requiring interrupt protection, and for each write, generates an entry for an intent log maintained within the database system. The log entries include a write identifier, storage device information associated with a write, and a write statues indication which are used to identify failed writes following a database system failure.

6 Claims, 5 Drawing Sheets

INTERRUPTED WRITE
- ONLY PART OF BLOCK 107 IS WRITTEN
- SOME SECTORS ARE LOST (107A)

INTERRUPTED WRITE
- ONLY PART OF BLOCK 107 IS WRITTEN
- SOME SECTORS ARE LOST (107A)

INTERRUPTED WRITE PROTECTION WITH GENERIC STORAGE

CROSS REFERENCE TO RELATED APPLICATIONS

This application claims priority under 35 U.S.C. §119(e) to the following and commonly-assigned patent application, which is incorporated herein by reference:

Provisional Patent Application Ser. No. 61/922,544, entitled "TORN WRITE PROTECTION WITH GENERIC STORAGE," filed on Dec. 31, 2013, by Gary Lee Boggs.

FIELD OF THE INVENTION

The present invention relates to a database system and stand-alone storage array including a device driver and daemon that provide interrupted write protection for database data.

BACKGROUND OF THE INVENTION

Within a database system, device and software failures, system resets, and power losses can result in unsuccessful write operations. During multi-sector writes, it is possible for a data transfer to be interrupted by software failures such as a node software "panic" or hardware failures such as node processor or memory errors, adapter failures, cable failures or loss of power to the system. This can result in partially written data, with some new sectors and some old sectors in the area that was to be written. This failure is known as an interrupted, a subset of unsuccessful writes.

FIG. 1 illustrates an interrupted database write operation. Referring to FIG. 1, a database write operation, WRITE DATA 101, is issued by database system 100 to storage subsystem 103 to write data to data block 107 within data storage device 105. A hardware or software failure, or other event, results in a successful write of only a portion 107A of data block 107, while the write to a portion 107B of the data block is unsuccessful.

Teradata Corporation database systems have employed HDD and SSD disk array systems from vendors that incorporate interrupted write protection into their products. In these implementations, when data in the interrupted write area is read, a special pattern is returned instead of the data. The database system can detect this pattern and optimize its recovery. That is, it can distinguish the special case of an incomplete write from that of general corruption, which is what the interrupted write would have looked like had the actual data been returned instead of the special pattern. This interrupted write protection is not available when using commodity storage such as direct attached disks or software RAID. These direct attached disks or software RAID devices are generic products which usually do not include interrupted write detection.

A system and method for providing interrupted write protection to a stand-alone commodity storage array is described below.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of the present invention. The following description is, therefore, not to be taken in a limited sense, and the scope of the present invention is defined by the appended claims.

Environment

Figure 1:
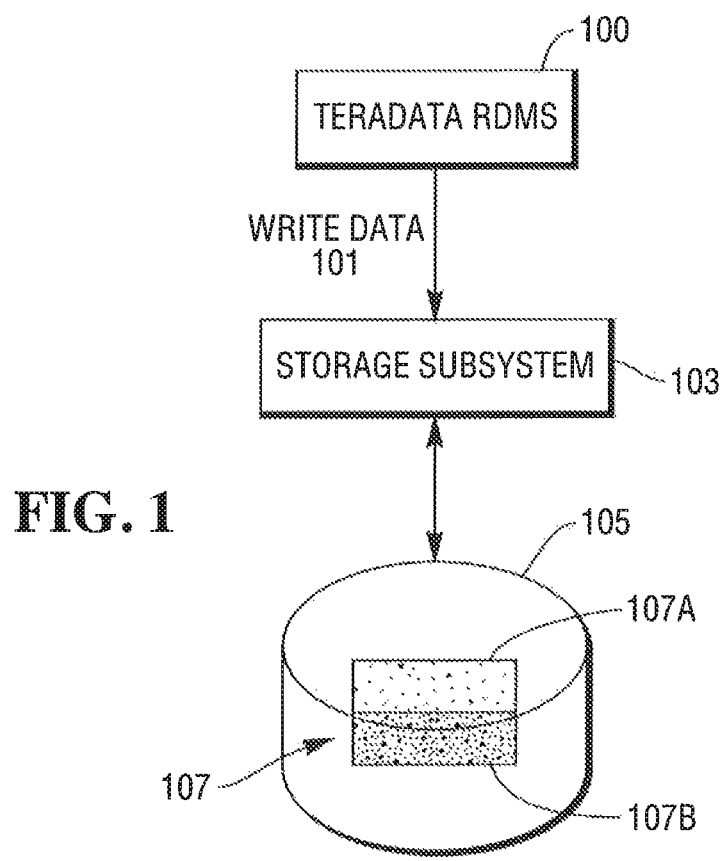
FIG. 1 is a simple block diagram illustrating a interrupted write operation.
Figure 2:
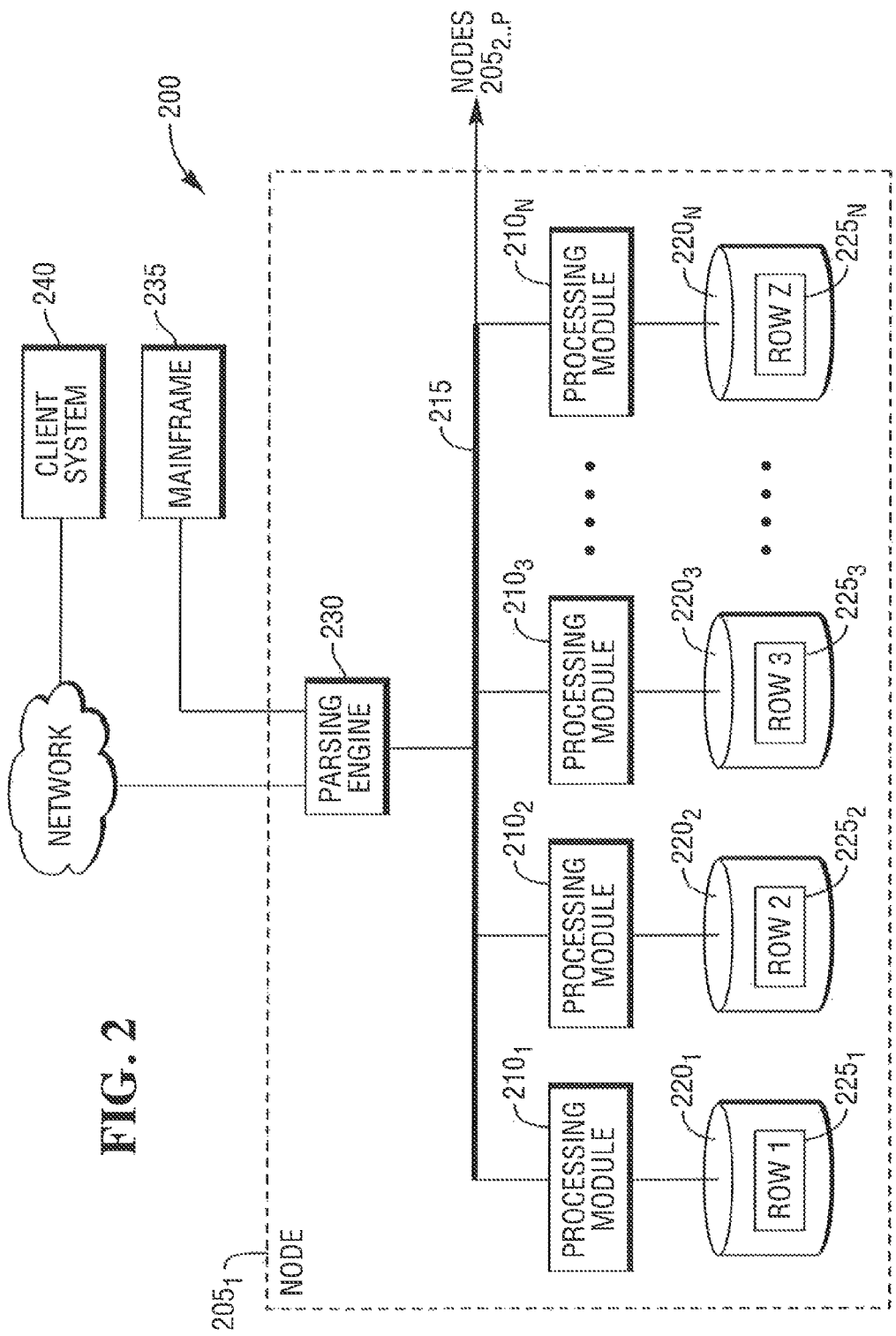
FIG. 2 is a block diagram of a node of a database system.

The technique for providing interrupted write protection to a commodity storage array disclosed herein has particular application, but is not limited, to large databases that might contain many millions or billions of records managed by a database system ("DBS") 200, such as a Teradata Active Data Warehousing System available from Teradata Corporation. FIG. 2 shows a sample architecture for one node $205_1$ of the DBS 200. The DBS node $205_1$ includes one or more processing modules $201_{1 \ldots N}$, connected by a network 215, that manage the storage and retrieval of data in data-storage facilities $220_{1 \ldots N}$. Each of the processing modules $210_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $210_{1 \ldots N}$ manages a portion of a database that is stored in a corresponding one of the data-storage facilities $220_{1 \ldots N}$. Each of the data-storage facilities $220_{1 \ldots N}$ includes one or more disk drives. The DBS may include multiple nodes $205_{2 \ldots P}$ in addition to the illustrated node $205_1$, connected by extending the network 215.

The system stores data in one or more tables in the data-storage facilities $22_{1 \ldots N}$. The rows $225_{1 \ldots Z}$ of the tables are stored across multiple data-storage facilities $220_{1 \ldots N}$ to ensure that the system workload is distributed evenly across the processing modules $210_{1 \ldots N}$. A parsing engine 230 organizes the storage of data and the distribution of table rows $225_{1 \ldots Z}$ among the processing modules $210_1 \ldots N$. The parsing engine 230 also coordinates the retrieval of data from the data-storage facilities $220_{1 \ldots N}$ in response to queries received from a user at a mainframe 235 or a client computer 240. The DBS 200 usually receives queries and commands to build tables in a standard format, such as SQL.

In one implementation, the rows $225_{1 \ldots Z}$ are distributed across the data-storage facilities $220_{1 \ldots N}$ by the parsing engine 230 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $220_{1 \ldots N}$ and associated processing modules $210_{1 \ldots N}$ by a hash bucket map. The characteristics of the columns chosen for the primary index determine how evenly the rows are distributed.

Figure 3:
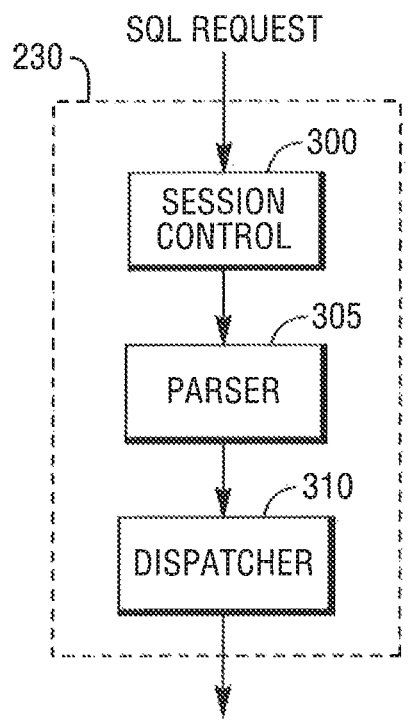
FIG. 3 is a block diagram of a parsing engine.

In one example system, the parsing engine 230 is made up of three components: a session control 300, a parser 305, and a dispatcher 310, as shown in FIG. 3. The session control 300 provides the logon and logoff function. It accepts a request for authorization to access the database, verifies it, and then either allows or disallows the access.

Figure 4:
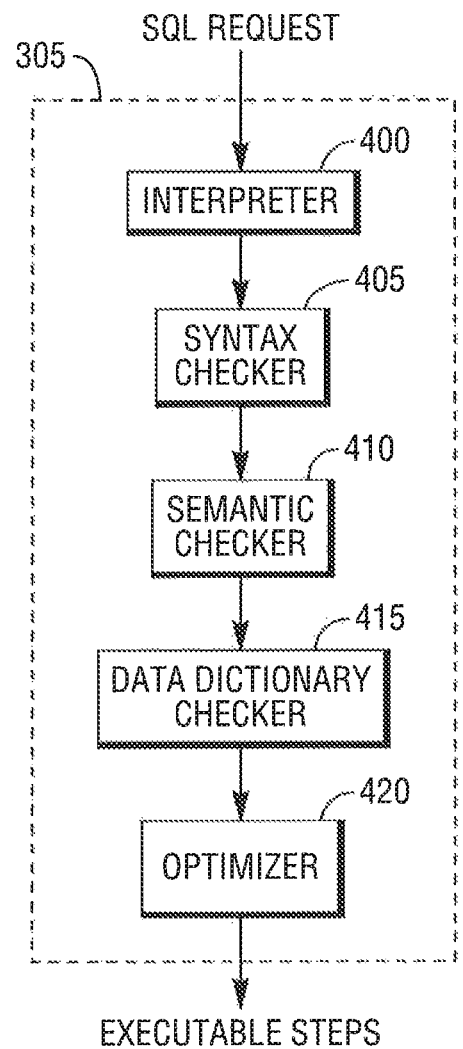
FIG. 4 is a flow chart of a parser.

Once the session control 300 allows a session to begin, a user may submit a SQL request, which is routed to the parser 305. As illustrated in FIG. 4, the parser 305 interprets the SQL request (block 400), checks it for proper SQL syntax (block 405), evaluates it semantically (block 410), and consults a data dictionary to ensure that all of the objects specified in the SQL request actually exist and that the user has the authority to perform the request (block 415). Finally, the parser 305 runs an optimizer (block 420), which develops the least expensive plan to perform the request.

Interrupted Write Protection for Commodity Storage Array

The present invention is a design for an IWIL device driver that is inserted into the storage device stack—the chain of attached device objects that represent a device's storage device drivers—and a user-space process, an IWIL daemon, that handles recovery and remote requests. For example, on Linux, the IWIL driver could be a separate block device driver or a module that provides an interface to an existing driver, such as the Teradata Virtual Storage Extent Driver, depending on the requirements of the implementation.

Figure 5:
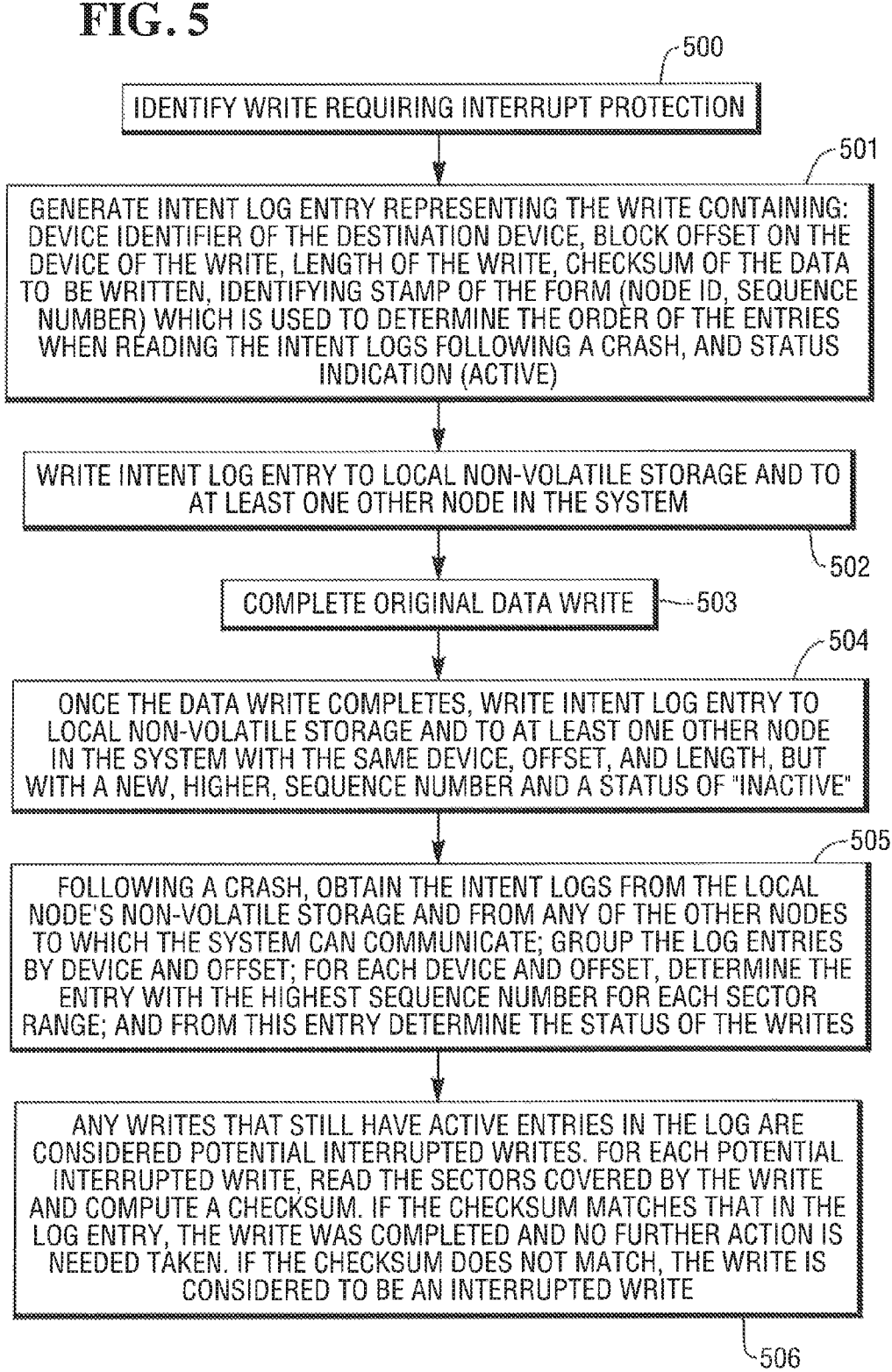
FIG. 5 is a flow chart illustrating the operation of a device driver and daemon to provide interrupted write protection to a stand-alone commodity storage array utilized within a database system, in accordance with the present invention.

When a write needing interrupted write protection, as determined by the application layers above, occurs, it is routed through the IWIL driver. The IWIL driver and daemon perform the following actions, as illustrated in FIG. 5:
Step 501: The driver generates an intent log entry representing the write.
  Minimally, this entry contains:
  a. The device identifier of the destination device, such as the Linux dev_t or the TVS global device id.
  b. The block offset on the device of the write.
  c. The length of the write.
  d. A checksum of the data to be written. For implementations supporting T-10 DIF/DIX, the T10 checksum or IP checksum can be used. For other implementations, a checksum can be calculated using, for example, the CRC32 instruction of the Intel CPU or a software checksum implementation.
  e. An identifying stamp of the form (node id, sequence number) which is used to determine the order of the entries when reading the intent logs following a crash.
  f. A status indication (active).
Step 502: The driver writes the intent log entry to local non-volatile storage.
  Ideally, this is non-volatile memory in the node, such as a flash card, but may also be a locally attached solid state disk (SSD) or hard disk (HDD).
  In parallel with the write to local non-volatile storage, the driver sends the intent log entry to at least one other node in the system via a network connection such as Infiniband, Ethernet or bynet. This is done in case the original node does not come back after a crash and the application, e.g., Teradata AMP, moves to another node.
  a. For implementations that support RDMA and use non-volatile memory, the driver can initiate a transfer directly into the non-volatile memory of the remote node to an area reserved for use by the initiating node.
  b. For other implementations, a message is sent to the IWIL daemon on the target node which will perform the write.
Step 503: Once step 502 completes, the original data write is allowed to continue.
Step 504: Once the data write completes, step 502 is repeated with the same device, offset, and length, but a new, higher, sequence number and a status of "inactive". An optimization is to allow the write completion to be communicated to the application prior to the intent log writes completing, and to batch these completions together to minimize network and I/O traffic.
Step 505: Following a crash, the IWIL daemon obtains the intent logs from the local node's non-volatile storage and from any of the other nodes with which it can communicate. The IWIL daemon groups the log entries by device and offset. For each device and offset, the daemon determines the entry with the highest sequence number for each sector range, assuming that only one node will be writing to a given device and sector range, and from this entry the daemon determines the status of the write.
Step 506: Any writes identified as having active entries in the log are considered potential interrupted writes. The daemon reads the sectors covered by a potential interrupted write and computes a checksum. If the checksum matches that in the log entry, the write is identified as completed and no further action need be taken. If the checksum does not match, the write is considered to be an interrupted write and this status will be communicated to the application on the next read of the affected sectors. This can be done in a couple of different ways, depending on requirements:
  a. The daemon could write the special interrupted write pattern over the affected sector range.
  b. The device and block range could be uploaded to another driver which monitors reads and that driver could return the interrupted write pattern when a matching read is detected.

Figure 6:
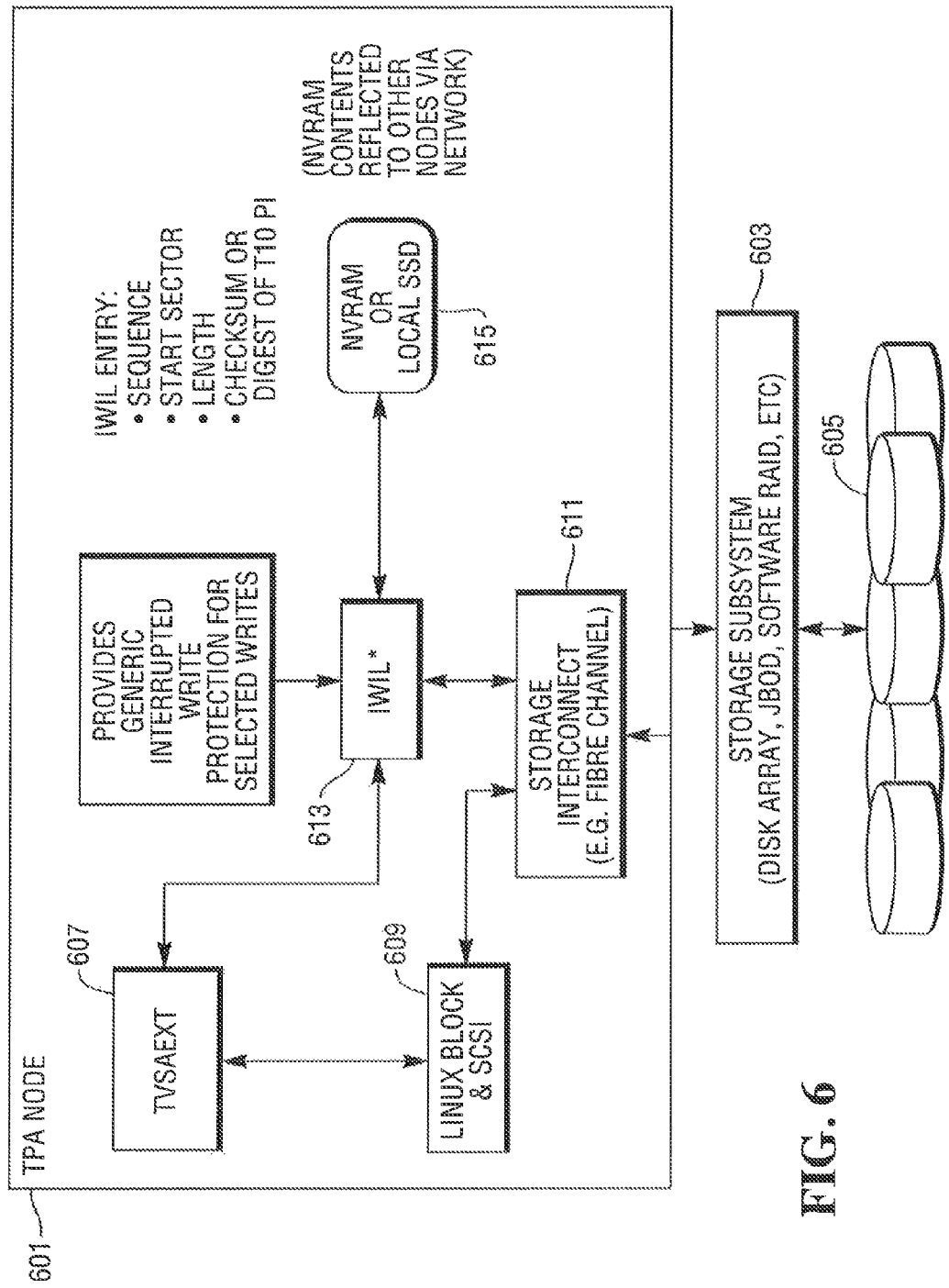
FIG. 6 is a block diagram of a database node and commodity storage subsystem including a device driver and daemon above the commodity storage subsystem providing interrupted write protection for database data in accordance with the present invention.

FIG. 6 shows a block diagram of a database system node and commodity storage subsystem, including a device driver and daemon above the commodity storage subsystem providing interrupted write protection for database data.

Referring to FIG. 6, a Teradata Trusted Parallel Application (TPA) node 601 and commodity storage subsystem 603 and storage drives 605 are shown. A TPA node is a database node that manages a Teradata database.

TPA node 601 includes existing software components TVSAEXT 607, a the Teradata Virtual Storage Extent Driver; a Linux Block & SCSI driver 609; and Storage Interconnect 611. Linux Block & SCSI driver 609 and Storage Interconnect 611 are parts of the Linux operating system and are the drivers used to access disk storage. Generic interrupted write protection if provided by the IWIL driver 613. The arrow between IWIL driver 613 and TVSAEXT 607 is intended to show a call interface, where the TVSAEXT driver 607 tells IWIL driver 613 that a particular write needs interrupted write protection. For non-Teradata implementations, a block driver could be constructed to replace TVSAEXT driver 607 in FIG. 6.

Non-volatile Random Access Memory (NVRAM) or Local SSD 615 provides physical storage for the intent log, either non-volatile memory in the node or on a solid state drive (SSD) attached to the node. The intent log entries written to NVRAM or Local SSD 615 are copied to another node over a network, such as infiniband, so that the log entries are not lost if the node 601 crashes.

Storage Subsystem 603 and disks 605 represent a generic disk storage subsystem such as a disk array, a plurality of raw disks (JBOD for Just a Bunch of Disks, or a software RAID. A software RAID would be a mirroring or other RAID (redundant array of inexpensive disks) implementation in software that does not use a disk array controller.

The figures and specification illustrate and describe a method for providing interrupted write protection to a stand-alone commodity storage array utilized within a database system.

The foregoing description of the invention has been presented for purposes of illustration and description, it is not intended to be exhaustive or to limit the invention to the precise form disclosed. Accordingly, this invention is intended to embrace all alternatives, modifications, equivalents, and variations that fall within the spirit and broad scope of the attached claims

What is claimed is:

1. A computer-implemented method for providing interrupted write protection to a stand-alone commodity storage array utilized within a database system, the method comprising the steps of:
   identifying, by processing means within said database system, a write of data from said database system to said storage array requiring interrupt protection;
   generating, by said processing means, an entry for an intent log maintained within said database system, said entry representing the write and containing a write identifier and an active status indication;
   completing, by said processing means, the write of data to said storage array;
   once the data write completes, generating, by said processing means, an entry to said intent log, said entry representing the write and containing a write identifier and an inactive status indication;
   following a database system failure, examining, by said processing means, said intent log entries to determine the status of the write;
   identifying, by said processing means, said write as an interrupted write when the most current intent log entry corresponding to said write has an active status indication; and
   reissuing, by said processing means, said write of data to said storage array when said write is identified as an interrupted write; and wherein
   said write identifiers include: a device identifier of a storage device within said storage array, a block offset on the storage device of the write, a length of the write, a checksum of the data to be written, and an identifying stamp used to determine the order of the entries when reading the intent logs following a crash.

2. The computer-implemented method for providing interrupted write protection to a stand-alone commodity storage array utilized within a database system in accordance with claim 1, wherein:
   said database system includes a plurality of processing nodes; and
   said intent log entries are written to a local non-volatile storage within said database system and to at least one other node in the database system.

3. A computer-implemented method for providing interrupted write protection to a stand-alone commodity storage array utilized within a database system, the method comprising the steps of:
   identifying, by processing means within said database system, a write of data from said database system to said storage array requiring interrupt protection;
   generating, by said processing means, an entry for an intent log maintained within said database system, said entry representing the write and containing a device identifier of a storage device within said storage array, a block offset on the storage device of the write, a length of the write, a checksum of the data to be written, an identifying stamp used to determine the order of the entries when reading the intent logs following a crash, and an active status indication;
   completing, by said processing means, the write of data to said storage array;
   once the data write completes, generating, by said processing means, an entry to said intent log, said entry representing the write and containing said device identifier of the storage device within said storage array, the block offset on the storage device of the write, the length of the write, the checksum of the data to be written, the identifying stamp used to determine the order of the entries when reading the intent logs following a crash, and an inactive status indication;
   following a database system failure, examining, by said processing means, said intent log entries to determine the status of the write;
   identifying, by said processing means, said write as a potential interrupted write when the most current intent log entry corresponding to said write has an active status indication;
   reading, by said processing means, the data within the storage device and block offset associated with said write and computing a checksum therefrom;
   comparing, by said processing means, the checksum computed from the data read from the storage device and block offset associated with said write with the checksum contained in the most current intent log entry corresponding to said write having an active status indication; and
   identifying, by said processing means, said potential interrupted write as said interrupted write when said checksum values do not match; and
   reissuing, by said processing means, said write of data to said storage array when said write is identified as an interrupted write.

4. A database system, comprising:
   a stand-alone commodity storage array; and
   processing means for:
   identifying a write of data from said database system to said storage array requiring interrupt protection;

generating an entry for an intent log maintained within said database system, said entry representing the write and containing a write identifier and an active status indication;

completing the write of data to said storage array;

once the data write completes, generating an entry to said intent log, said entry representing the write and containing a write identifier and an inactive status indication;

following a database system failure, examining said intent log entries to determine the status of the write;

identifying said write as an interrupted write when the most current intent log entry corresponding to said write has an active status indication; and reissuing said write of data to said storage array when said write is identified as an interrupted write, and wherein said write identifiers include: a device identifier of a storage device within said storage array, a block offset on the storage device of the write, a length of the write, a checksum of the data to be written, and an identifying stamp used to determine the order of the entries when reading the intent logs following a crash.

5. The database system in accordance with claim 4, wherein:

said intent log entries are written to a local non-volatile storage within said database system and to at least one other node in the database system.

6. A database system comprising:

a stand-alone commodity storage array; and processing means for:

identify a write of data from said database system to said storage array requiring interrupt protection;

generating an entry for an intent log maintained within said database system, said entry representing the write and containing a device identifier of a storage device within said storage array, a block offset on the storage device of the write, a length of the write, a checksum of the data to be written, an identifying stamp used to determine the order of the entries when reading the intent logs following a crash, and an active status indication;

completing the write of data to said storage array;

once the data write completes, generating an entry to said intent log, said entry representing the write and containing said device identifier of the storage device within said storage array, the block offset on the storage device of the write, the length of the write, the checksum of the data to be written, the identifying stamp used to determine the order of the entries when reading the intent logs following a crash, and an inactive status indication;

following a database system failure, examining said intent log entries to determine the status of the write;

identifying said write as a potential interrupted write when the most current intent log entry corresponding to said write has an active status indication;

reading the data within the storage device and block offset associated with said write and computing a checksum therefrom;

comparing the checksum computed from the data read from the storage device and block offset associated with said write with the checksum contained in the most current intent log entry corresponding to said write having an active status indication; and identifying said potential interrupted write as said interrupted write when said checksum values do not match; and reissuing said write of data to said storage array when said write is identified as an interrupted write.

* * * * *

UNITED STATES PATENT AND TRADEMARK OFFICE
CERTIFICATE OF CORRECTION

Page 1 of 1

PATENT NO. : 9,665,431 B2
APPLICATION NO. : 14/570280
DATED : May 30, 2017
INVENTOR(S) : Gary Lee Boggs It is certified that error appears in the above-identified patent and that said Letters Patent is hereby corrected as shown below:

On the Title Page

Item (73)
Assignee: Teredata US, Inc.

Should read:
Assignee: Teradata US, Inc.

Signed and Sealed this
Eleventh Day of July, 2017

Joseph Matal
*Performing the Functions and Duties of the
Under Secretary of Commerce for Intellectual Property and
Director of the United States Patent and Trademark Office*